United States Patent

Basse et al.

[11] Patent Number: 5,882,510
[45] Date of Patent: Mar. 16, 1999

[54] CONTACT FILTER BLOCK OF JOINED TUBE SECTIONS

[75] Inventors: Hartwig Basse, Nordenham; Hans-Joachim Bittner, Brake, both of Germany

[73] Assignee: Norddeutsche Seekabelwerke Aktiengesellschaft, Germany

[21] Appl. No.: 908,223

[22] Filed: Aug. 7, 1997

Related U.S. Application Data

[63] Continuation of Ser. No. 387,766, Feb. 15, 1995, abandoned.

[30] Foreign Application Priority Data

Jun. 21, 1993 [DE] Germany ............... 4320469 4

[51] Int. Cl.$^6$ ............................... C02F 3/10
[52] U.S. Cl. ............... 210/150; 210/323.2; 210/497.01; 428/34.1
[58] Field of Search ............... 210/150, 151, 210/232, 323.2, 497.01, 497.1; 261/94; 55/350.1; 138/111, 123; 428/34.1, 35.7; 156/196, 218

[56] References Cited

U.S. PATENT DOCUMENTS

| | | | |
|---|---|---|---|
| 585,497 | 6/1897 | Aufrichtig | 210/323.2 |
| 1,804,478 | 5/1931 | Parker | 138/111 |
| 3,589,518 | 6/1971 | Brebion | 210/150 |
| 3,704,869 | 12/1972 | Priestley | 261/112.2 |
| 4,043,917 | 8/1977 | Rowley et al. | 210/323.2 |
| 4,732,585 | 3/1988 | Lerner | 210/150 |
| 4,929,487 | 5/1990 | Basse | 210/150 |
| 5,160,395 | 11/1992 | Basse et al. | 210/150 |
| 5,225,116 | 7/1993 | Menzel et al. | 261/94 |
| 5,443,724 | 8/1995 | Williamson et al. | 210/323.2 |
| 5,693,383 | 12/1997 | Basse et al. | 428/34.1 |
| 5,772,870 | 6/1998 | Basse | 210/150 |

FOREIGN PATENT DOCUMENTS

| | | | |
|---|---|---|---|
| B-13896/92 | 7/1994 | Australia . | |
| 508223 | 3/1992 | European Pat. Off. . | |
| 1619904 | 9/1970 | Germany . | |
| 2049072 | 4/1971 | Germany | 210/150 |
| 4001482 | 4/1991 | Germany . | |
| 2122895 | 5/1990 | Japan | 210/150 |
| 1363416 | 8/1974 | United Kingdom . | |

OTHER PUBLICATIONS

6109 Korrespondenz Abwasser 35 (1988) Jan. No. 1 St Auguston, W. Germany.

*Primary Examiner*—Joseph W. Drodge
*Attorney, Agent, or Firm*—Deveau, Colton & Marquis

[57] ABSTRACT

Contact-filter block (10) for the construction of trickling filters or rotating disc filters such as those used for the biological treatment of waste waters. The tube sections (11) of which the contact-filter block (10) is made up have an outside surface (12) structured in a net-like manner, the outside surfaces of the tube sections (11) being joined by joints (13) to avoid constrictions in the clear cross section of the tube sections (11).

4 Claims, 3 Drawing Sheets

CONTACT FILTER BLOCK OF JOINED TUBE SECTIONS

This application is a continuation, of application No. 08/387,766, filed Feb. 15, 1995, now abandoned.

BACKGROUND OF THE INVENTION

The invention relates to a contact-filter block in accordance with the preamble of Patent Claim 1.

Such contact-filter blocks are used to construct trickling filters or rotating disc filters for the biological treatment of waste waters or other fluids. For this purpose, the contact-filter blocks are populated with a bio-mass, a so-called biological slime.

It is known to join a multiplicity of mutually adjacent tube sections having an outside surface structured in a net-like manner together to construct contact-filter blocks. The tube sections are joined by means of hot-tool welding by heating the end faces of the tube sections and applying pressure so that contact points of adjacent end faces of the tube sections fuse together and form joints.

As a result of this type of welding, material accumulations which constrict the (clear) internal cross-section of the tube sections are formed at the end faces of the tube sections. These cross-sectional constrictions in turn impede the flow through the contact-filter block in the longitudinal direction of the tube sections, thereby reducing the efficiency of such known contact-filter blocks.

SUMMARY OF THE INVENTION

The object of the invention is to provide a contact-filter block which is simple to produce and which has a high efficiency.

According to the invention, the object is achieved by a contact-filter block having the features of claim 1. Here constrictions of the clear cross-section of the tube sections and the performance losses associated therewith of such contact-filter blocks are avoided by the outside-surface joining of the tube sections, which joining renders a welding of the end faces superfluous.

Preferably, the tube sections are joined together only in the region of a contact point of the outside surfaces of adjacent tube sections by means of at least one joint. As a result, it is possible to join the tube sections in a very simple way and with positional accuracy and to use the material of the tube sections themselves to produce the joint.

It is particularly expedient to join the tube sections at oppositely situated end regions by means of one joint in each case since the end regions are readily accessible for producing the joint.

In a particular development of the invention, in the case of tube sections constructed as net-type tubes the joints are provided at the strands of the net-type tubes and, preferably, at the crossovers of the circumferential strands and longitudinal strands since the material accumulation at those points promotes the formation of the joints.

Occasionally, in particular to construct specially structured contact-filter blocks, it is expedient that at least one joining web extends essentially radially from the outside surface of the tube sections in the direction of each adjacent tube section and the joints are disposed at corresponding joining webs of adjacent tube sections.

It is within the scope of the invention that the joints are constructed by welding, in particular pressure welding in the form of a spot weld and/or linear weld, as a result of which a reliable joint can be produced with little effort and without filler material.

Further features of the invention and its advantages emerge from the remaining subclaims and the description.

Preferred exemplary embodiments of the invention are explained in greater detail below with reference to the drawing.

DESCRIPTION OF THE PREFERRED EMBODIMENTS

Figure 1:
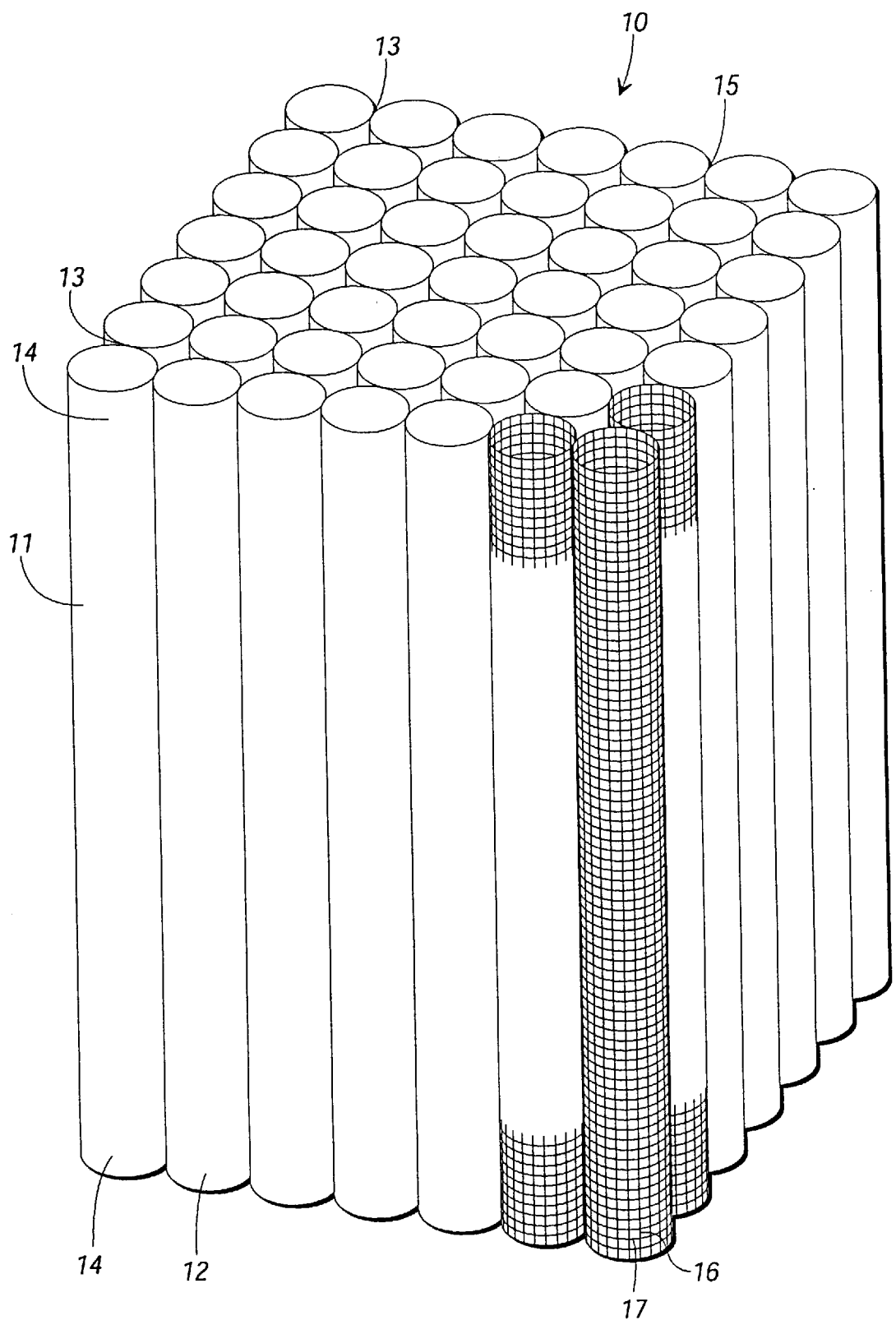
FIG. 1 shows a perspective and diagrammatic view of a contact-filter block.

A contact-filter block 10 of the type shown in FIG. 1 is used for the biological treatment of fluids and, specifically, of waste waters. One, or even a plurality of contact-filter blocks 10, populated with biological slime is disposed for this purpose in a stationary manner in a liquid tank as a so-called trickling filter, the waste water being passed through the liquid tank and the contact-filter block 10 for the purpose of biological treatment. On the other hand, the contact-filter blocks 10 may, however, also be disposed as so-called rotating disc filters in an immersed-drum reactor, the waste water contained in a liquid tank flowing through the contact-filter blocks 10 as the result of a rotational drive of the drum reactor.

The contact-filter blocks 10 are made up of tube sections 11 which have an outside surface 12 structured in a net-like manner. In the exemplary embodiments shown here, the tube sections 11 are constructed as net-type tubes. The net-type tubes are formed with longitudinal strands 16 extending in the axial direction of the net-type tubes and circumferential strands 17 extending in the circumferential direction of the net-type tubes.

According to the invention, the contact-filter block 10 is formed by joining the mutually adjacent tube sections 11 together only at the outside surface in accordance with the desired dimensions of the contact-filter block 10. In this connection it is, as a rule, sufficient that the adjacent tube sections 11 are joined together at two joints 13, the joints 13 being situated at the point where the outside surfaces 12 of the tube sections 11 to be joined touch one another.

Figure 2:
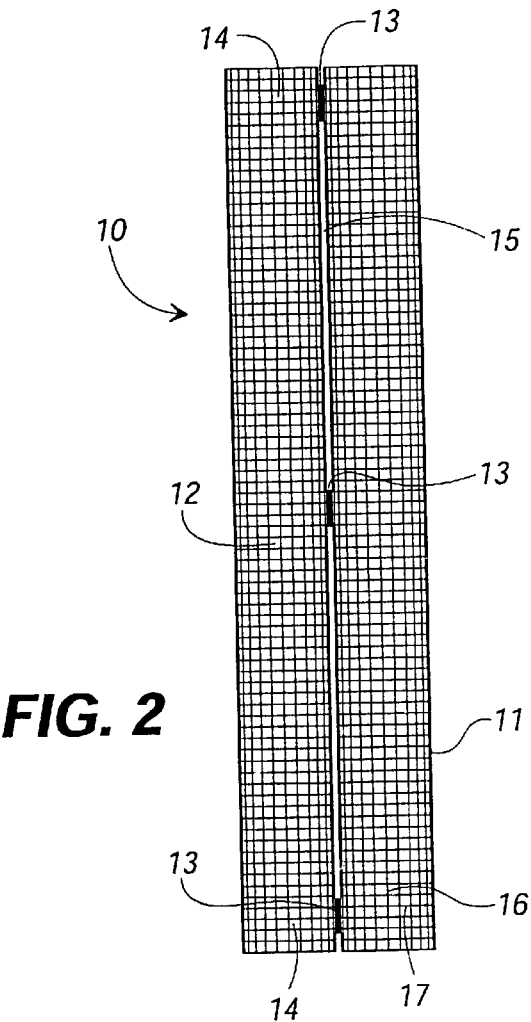
FIG. 2 shows the side projection of two joined tube sections of the contact-filter block shown in FIG. 1.

Preferably, one of the joints 13 is situated at each of the two oppositely situated end regions 14 of the tube sections 11. These may be disposed at a small distance from the end faces (FIG. 2), but they must extend up to the end face of the tube sections 11. Optionally, as shown in FIG. 2, a further joint 13 may additionally be situated between the joints 13 at the oppositely situated end regions 14.

In all cases, two adjacent tube sections 11 make contact on a contact line 15 which extends approximately over the entire length of said tube sections 11. In each case, all the joints 13 of two tube sections 11 lie on the contact line 15.

The joints 13 are produced by welding, for example by pressure welding. For the purpose of spot welding, the tube sections 11 are positioned with respect to one another in such a way that they touch one another at crossovers of longitudinal strands 16 and circumferential strands 17 of the net-type tubes since the material accumulation of the net-type tubes at those points promotes the formation of the spot weld.

Two of the tube sections 11 are joined together by linear welding by first positioning them with respect to one another in such a way that, in each case, a longitudinal strand 16 of one tube section 11 is in contact with a longitudinal strand 16 of the other tube section 11 along the common contact line 15 formed in this way. Then the longitudinal strands 16 between the crossovers of the longitudinal strands 16 and the circumferential strands 17 are joined by the joints 13, the latter being formed as linear weld points. All the joints 13 are consequently associated with the contact line 15.

The spot and linear welding is carried out by pressure welding by moving one heating and pressing device of the welding equipment towards the tube sections 11 at the point where they are in mutual contact along the contact line 15 in a tong-like manner from the clear interior of the adjacent tube sections 11. As a result of the action of heat and pressure, the material melts at the planned joints 13 and fuses together so that the spot or linear weld is formed.

In the case of the contact-filter block 10 (FIGS. 1 to 3), the tube sections 11 are aligned with respect to one another in rows and lines, the row and line distance corresponding approximately to the diameter of the tube sections 11.

Figure 3:
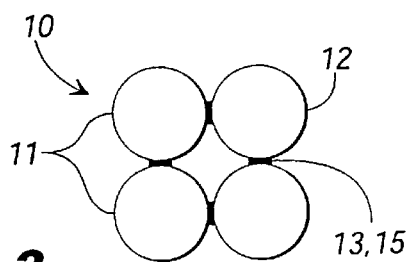
FIG. 3 shows the projection of the contact-filter block shown in FIG. 2 on the end face of the mutually joined tube sections.
Figure 4:
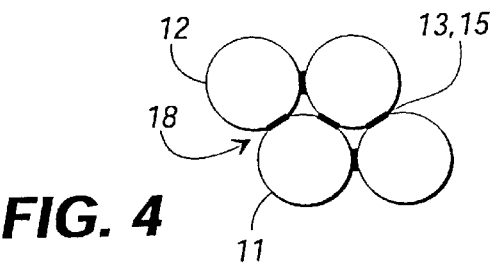
FIG. 4 shows a second exemplary embodiment of a contact-filter block in a projection analogous to FIG. 3.

In the case of a contact-filter block 18 (FIG. 4), the tube sections 11 are also disposed in rows and lines, but offset "into the gap". As a result of this indentation, the row and line spacing is less than the diameter of the tube sections 11 (FIG. 3). In addition, in this type of relative arrangement of the tube sections 11 with respect to one another, there are five different contact lines 15 of the outside surfaces 13 in the case of four adjacent tube sections 11. As a result, the contact-filter block 18 acquires a particularly high inherent stability.

Figure 6:
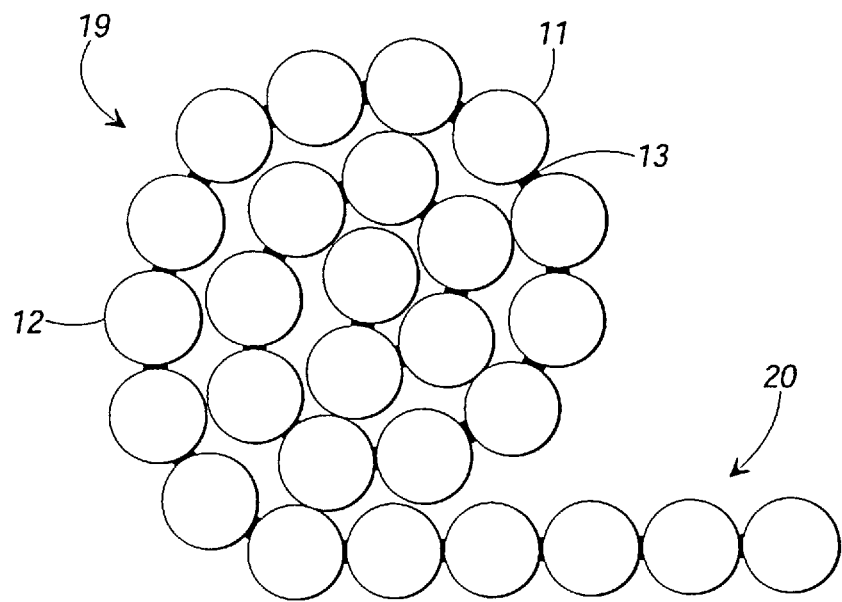
FIG. 6 shows a projection of a fourth exemplary embodiment of a contact-filter block on the end face of the mutually joined tube sections.

A further contact-filter block 19 is shown in FIG. 6. This is formed by joining the mutually adjacent tube sections 11, as it were, to form a strip 20 and then rolling up said strip 20 spirally to form the approximately circular contact-filter block 19. In this case, the contact-filter block 19 is completed by also joining the outside surface of the last tube section 11 of the strip 20 to the outside surface of that tube section 11 already rolled up, against which the last tube section 11 comes to rest after the strip 20 has been completely rolled up. Additionally, to increase the inherent stability of the contact-filter block 19, the tube sections 11 which are only in mutual contact as a result of the rolling-up can be provided with further joints 13.

Figure 5:
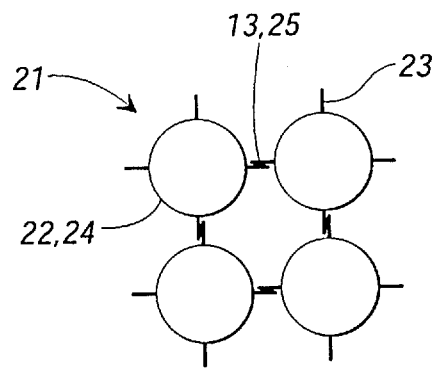
FIG. 5 shows a third exemplary embodiment of a contact-filter block in a projection analogous to FIG. 3.

A contact-filter block 21, partially shown in FIG. 5, in accordance with another exemplary embodiment of the invention has tube sections 22 having joining webs 23. In this case, the joining web 23 extends essentially radially outwards from an outside surface 24 of the tube section 22 in the direction of each adjacent tube section 22. The joining webs 23 are disposed so as to be offset by approximately 90° on the external circumference of the tube sections. At least over a subregion, the joining web 23 concerned forms, with the corresponding joining web 23 of the adjacent tube section 22, a common contact point or even a contact line 25 with which the joint 13 or joints 13 are associated. The joining web 23 is preferably disposed directly on the associated longitudinal strand 16 of the tube section 22.

For the purpose of assembling the contact-filter block 21, the tube sections 22 are appropriately rotated with respect to one another, the joints 13 being constructed in the form of spot or linear welding of the corresponding joining webs 23. The spot and/or linear welding is carried out analogously to the manner described above, the heating and pressing devices of the welding equipment being moved towards one another from both sides of two joining webs 23 which are mutually adjacent in each case and forming the joint 13 on contact line 25.

The joining webs 23 may, for instance, extend along the entire length of the tube sections 22. However, they may also have an interrupted pattern which is such that they have at least two subregions which are spaced apart from one another and with which at least one of the joints 13 is associated in each case. The construction of the joining webs 23 and the number and type of the joints 13 depend on the particular conditions of use of the contact-filter block 21.

We claim:

1. Apparatus for the construction of trickling filters or rotating disc filters for the biological treatment of fluids, comprising a plurality of tube sections joined together, wherein:

a. each of said tube sections has an outside surface structured in a net-like manner to allow fluid to pass therethrough;

b. said outside surfaces of adjacent tube sections are joined together by at least two joints and said joints being disposed on a common contact line which extends approximately over the entire length of each of said tube sections, wherein said adjacent tube sections make contact with each other on said common contact line; and c. said tube sections are disposed and joined in rows and lines in such a way that the line and row spacing corresponds approximately to the diameter of said tube sections.

2. Apparatus for the construction of trickling filters or rotating disc filters for the biological treatment of fluids, comprising a plurality of tube sections joined together, wherein:

a. each of said tube sections has an outside surface structured in a net-like manner to allow fluid to pass therethrough;

b. said outside surfaces of adjacent tube sections are joined together only in the region of contact points of said outside surfaces of adjacent tube sections;

c. said outside surfaces of said adjacent tube sections are joined together by at least three joints, two joints at oppositely situated end regions of said tube sections, and at least one additional joint disposed between said two joints at oppositely situated end regions, said joints being disposed on a common contact line which extends approximately over the entire length of each of said tube sections, wherein said adjacent tube sections make contact with each other on said common contact line;

d. said outside surface of each of said tube sections comprising a plurality of intersecting circumferential strands and longitudinal strands; and e. said joints are provided at crossovers of said circumferential strands and said longitudinal strands.

3. Apparatus according to claim 2, wherein said joints are formed by welding.

4. Apparatus for the construction of trickling filters or rotating disc filters for the biological treatment of fluids, comprising a plurality of tube sections joined together, wherein:

a. each of said tube sections has an outside surface structured in a net-like manner to allow fluid to pass therethrough;

b. said outside surfaces of adjacent tube sections are joined together by at least two joints, said joints being disposed on a common contact line which extends approximately over the entire length of each of said tube sections, wherein said adjacent tube sections make contact with each other on said common contact line; and c. said tube sections are disposed and joined in rows and lines so as to be offset with respect to one another in such a way that the line and row spacing is less than the diameter of the tube section.

* * * * *